(12) United States Patent
Eshkoli

(10) Patent No.: US 7,787,007 B2
(45) Date of Patent: *Aug. 31, 2010

(54) METHOD AND SYSTEM FOR PREPARING VIDEO COMMUNICATION IMAGE FOR WIDE SCREEN DISPLAY

(75) Inventor: Noam Eshkoli, El Mond (IL)

(73) Assignee: Polycom, Inc., Pleasanton, CA (US)

( * ) Notice: Subject to any disclaimer, the term of this patent is extended or adjusted under 35 U.S.C. 154(b) by 1049 days.

This patent is subject to a terminal disclaimer.

(21) Appl. No.: 11/465,352

(22) Filed: Aug. 17, 2006

(65) Prior Publication Data

US 2006/0274195 A1 Dec. 7, 2006

Related U.S. Application Data

(63) Continuation of application No. 10/851,448, filed on May 21, 2004, now Pat. No. 7,113,200.

(51) Int. Cl.
*H04N 7/14* (2006.01)

(52) U.S. Cl. ............. 348/14.07; 348/14.08; 348/14.09; 348/445; 348/556

(58) Field of Classification Search ... 348/14.01–14.16, 348/556, 240.2, 473, 558
See application file for complete search history.

(56) References Cited

U.S. PATENT DOCUMENTS

| | | | |
|---|---|---|---|
| 4,651,208 A | 3/1987 | Rhodes et al. | |
| 5,541,639 A | 7/1996 | Takatsuki et al. | |
| 5,600,646 A | 2/1997 | Polomski | |
| 5,659,369 A * | 8/1997 | Imaiida | 348/556 |
| 5,835,129 A * | 11/1998 | Kumar | 348/14.09 |
| 5,838,664 A | 11/1998 | Polomski | |
| 6,278,478 B1 | 8/2001 | Ferriere | |
| 6,300,973 B1 | 10/2001 | Feder et al. | |
| 6,584,077 B1 | 6/2003 | Polomski | |
| 6,915,331 B2 | 7/2005 | Fuller et al. | |
| 2003/0023742 A1* | 1/2003 | Allen et al. | 709/231 |
| 2003/0174202 A1 | 9/2003 | Eshkoli et al. | |
| 2004/0042553 A1 | 3/2004 | Elbaz et al. | |
| 2004/0117218 A1 | 6/2004 | Friedrich et al. | |

FOREIGN PATENT DOCUMENTS

JP 2001224001 A 8/2001

OTHER PUBLICATIONS

Lei, et al. "Video Bridging Based on H.261 Standard" IEEE Transactions on Circuits and Systems for Video Technology 4 (1994), pp. 425-436.
Search Report received in co-pending European patent application No. 05009312.9 dated Sep. 8, 2005.

* cited by examiner

*Primary Examiner*—Melur Ramakrishnaiah
(74) *Attorney, Agent, or Firm*—Wong, Cabello, Lutsch, Rutherford & Brucculeri, LLP

(57) ABSTRACT

A system and method is disclosed for composing a video layout having an aspect ratio of 16:9 from a plurality of video segments having an aspect ratio other than 16:9. For example, the plurality of video segments might have an aspect ratio of 4:3. To create a composite frame having an aspect ratio of about 16:9, the disclosed system scales each one of the segments and places each scaled segment in the layout in such a way that the composite layout has an aspect ratio of about 16:9.

20 Claims, 7 Drawing Sheets

Normal

Zoom

Wide

METHOD AND SYSTEM FOR PREPARING VIDEO COMMUNICATION IMAGE FOR WIDE SCREEN DISPLAY

CROSS-REFERENCE TO RELATED APPLICATIONS

This application is a continuation of U.S. patent application Ser. No. 10/851,448, filed May 21, 2004, now U.S. Pat. No. 7,113,200, the contents of which are hereby incorporated by reference.

BACKGROUND OF THE INVENTION

1. Field of the Invention

The present invention relates to the field of video communication and more particularly to a method and system of preparing images for wide screen displays in video communication.

2. Description of the Related Art

Recently, a new type of video display, known as a Wide Screen display, has been introduced into the market. As is known, the aspect ratio of a video display or screen is the ratio of the width of the picture to the height of the picture. Common video screens have an aspect ratio of about 4:3. In contrast, a wide screen display has an aspect ratio of about 16:9, which is about the same aspect ratio of cinema screens. For most current TV sets, the aspect ratio is about 4:3. For a high definition TV (HDTV), the ratio is about 16:9. An exemplary resolution of a wide screen display may be about 1024×576 pixels (width×height), while the resolution of a common video display is about 640×480 pixels. Common resolution for video communication is Common Intermediate Format (CIF), which is about 352×288 pixels. To match the aspect ratio of a video display of about 4:3, the aspect ratio of a pixel for CIF is about 12:11. The 12:11 aspect ratio for each pixel creates an image with an entire aspect ratio of (352*12) to (288*11), which is about (4224:3168) or (4:3).

Common video communication equipment, which includes but is not limited to a Video Communication Control Unit (VCCU) or endpoints, normally uses video images with resolutions such as Quarter of Common Intermediate Format (QCIF), CIF, or 4CIF (four times Common Intermediate Format) with an aspect ratio of 4:3. An exemplary VCCU may be a Multipoint Control Unit (MCU), a Multimedia Gateway, etc. Typically, a VCCU serves as a switchboard and/or conference builder for the network. In operation, the VCCU receives and transmits coded video streams to and from various user terminals or codecs. A Multipoint Control Unit (MCU) is conference controlling equipment typically located in a node of a network or in a terminal. The MCU receives several channels from access ports, processes audio and visual signals according to certain criteria, and distributes the processed signals to a set of connected channels. An example of an MCU includes the MGC-100, which is available from Polycom Inc., the assignee of the present disclosure. The MCU is a video communication controller that can be used in other types of video communication. It should be noted that the terms "MCU" and "VCCU" may be used interchangeably in the present disclosure.

An endpoint or a terminal is an entity on the network and is capable of providing real-time, two-way audio, visual, and/or data communication with other terminals or with the MCU. Currently, if an endpoint is associated with a wide screen display instead of a common 4:3 screen display, the endpoint as well as the other endpoints and the VCCU that are involved in the same video conference are not aware of the aspect ratio of 16:9 for the wide screen display. Therefore, the video image that the wide screen display receives from its associated endpoint has a common aspect ratio of 4:3. Typically, a wide screen display has three main types of settings, and a user may set the wide screen display using the control panel on the wide screen display to one of these settings. Currently, an image with an aspect ratio of 4:3 may be displayed on a wide screen display using one of the settings described below in conjunction with FIGS. 1A-1C.

Referring to FIG. 1A, a wide screen display 110 set to a normal setting shows a video image 112. In the normal setting, the video image 112 is displayed as is on the wide screen display 110. In other words, the video image 112 has the aspect ratio of 4:3, while the wide screen display has the aspect ratio of 16:9. Therefore, portions of the wide screen display 110 are not used, as illustrated by the black sections 114 in FIG. 1A.

Referring to FIG. 1B, a wide screen display 110 set to a zoom setting has a video image 120. In the zoom setting, the video image 120 is symmetrically enlarged by the internal electronics of the wide screen display 110. Therefore, portion of the image, in the top and/or the bottom, is cropped. Unfortunately, the cropped area can be an important part of the image, such as the face of a participant.

Referring to FIG. 1C, a wide screen display 110 set to a wide setting has a video image 130. In the wide setting, the electronics of the wide screen display 110 enlarges the regular image by asymmetrical factors so that the enlarged image substantially fits the wide screen display 110. To convert the regular aspect ratio of 4:3 to the wide screen aspect ratio of 16:9, the width of the regular image is increased by a factor of four, and the height is increased by a factor of three. The result is a distorted image 130, as shown in FIG. 1B. For example, a circle becomes elliptical, and a person becomes stretched wider. It is understood that wide screen displays may use other terminology for the 'normal, 'zoom' and 'wide' settings. In addition, other wide screen displays may have additional settings, which can be a combination of one or more of the above settings.

Current techniques for connecting a wide screen display to a video communication, as described above in conjunction with FIGS. 1A-1C, are insufficient. Therefore, a need exists in the art for a system and method for connecting a wide screen display to a videoconference. The subject matter of the present disclosure is directed to overcoming, or at least reducing the effects of, one or more of the problems set forth above.

SUMMARY OF THE PRESENT DISCLOSURE

The system and method of the present disclosure overcomes the above-described need in the prior art by providing techniques for using a wide screen display in a video conference. The disclosed system and method can inform the VCCU or MCU about the type of screen connected to each one of the endpoints participating in the video conference. Informing the VCCU or MCU can be done prior to starting the video conference or when establishing the video conference.

During the video conference, uncompressed video image data is encoded and transmitted to an endpoint with a wide screen display. The video image is processed before being encoded (compressed) so that the image can be displayed properly on the wide screen display. In the present disclosure, uncompressed video images refer to video data in a spatial domain (image domain) or in a transform domain (i.e. a DCT domain). It should be noted that the terms "uncompressed video," "open video," and "decoded video" may be used interchangeably in the present disclosure.

Processing the uncompressed video image at the VCCU can involve two stages. In a first stage, a composite video image having the aspect ratio of 16:9 is prepared by creating a layout from two or more video images having the aspect ratio of 4:3. In a second stage, the 16:9 composite video image is processed to fit the capabilities of the endpoint to handle an image with an aspect ratio of 16:9. An endpoint associated with a wide screen display can handle video images with an aspect ratio of 16:9 if the endpoint uses an H.264 or an H.263 with 'Custom Picture Formats' capability, for example.

However, endpoints that can handle only an H.261 or an H.263 without 'Custom Picture Format' capability cannot process an image having an aspect ratio of 16:9. Hence, these endpoints can only handle images having aspect ratio of 4:3. Therefore, the uncompressed composite video image with the 16:9 ratio has to be manipulated or altered before being transmitted to these endpoints. Once the composite video image is manipulated or altered, the endpoint receives and decodes the altered compressed video image. Then, the endpoint delivers the uncompressed video image to its associated wide screen display. The electronics of the wide screen display then reverse the manipulation or alteration of the uncompressed video image. Consequently, the wide screen display substantially displays the video image with an aspect ratio of 16:9 without the typical forms of distortion noted above with reference to FIGS. 1A-1C.

The disclosed system and method preferably solves the problem of how to inform a VCCU about the type of the screen that is associated with the endpoints. Current video communication protocols include but are not limited to H.320; H.324; H.323, etc. The current video communication protocols do not define any control or signaling that can be used to define the type of the screen at the endpoint. Informing the VCCU about the type of screen associated with an endpoint can be done by different techniques.

In one embodiment for informing the VCCU about the type of screen associated with an endpoint, the endpoint can inform the VCCU about the type of the screen when reserving the video conference. The aspect ratio or the type of the screen can be added as one of the parameters that are required during reserving a video conference. In other embodiments for informing the VCCU about the type of screen associated with an endpoint, an interactive voice response (IVR) session can be done when establishing the video conference or during the conference. A participant can be asked to select the type of the screen that is used from a variety of options. The participant can respond to the questions by pressing an appropriate key on a keypad at the endpoint and sending signals to the VCCU. The signals can include but are not limited to Dual Tone Modulation Frequency (DTMF) signals or Far End Camera Control (FECC) signals. The keypad can be the keypad of the remote control of the endpoint, the dialing key of a phone, etc. Other embodiments for informing the VCCU about the type of screen associated with an endpoint can use other signaling techniques, such as speech recognition. In still other embodiments for informing the VCCU, the disclosed system and method can use techniques for controlling multimedia video communication disclosed in U.S. patent application Publication No. 20030174202, which has Ser. No. 10/346,306 and is incorporated herein by reference in its entirety.

After receiving the type of screen associated with the endpoints, the MCU prepares and delivers compressed and manipulated video images to those endpoints with wide screens. The compressed and manipulated video images match one of the common compressed algorithms that can be used by the endpoint. Some common compression algorithms include but are not limited to H.261, H.263, H.264, and MPEG. The compressed video image is manipulated or altered in such a way that it can be processed by the endpoint. When the manipulated video image is displayed on the wide screen, it can be manipulated by the wide screen to substantially cover the entire screen without distortions.

For an endpoint that cannot use H.264 or H.263 with 'Custom Picture Format' capability as the compression algorithm, the aspect ratio that can be received and processed by the endpoint is about 4:3. Therefore, the disclosed system and method generates an uncompressed video image having the aspect ratio of 16:9, manipulates the image to reach the desired aspect ratio of 4:3, encodes the image, and sends the image to the endpoint.

In one embodiment of manipulating or altering the video image, the disclosed system and method generates an uncompressed video image, which can be a composite layout of two or more images. The uncompressed video image has the aspect ratio of 16:9. It should be noted that the terms "composite layout", "composite frame" and "composite image" may be used interchangeably throughout the present disclosure. Then, one or two rectangular segments having a background color (e.g., no information) is added on the top and/or the bottom of the 16:9 video image. The additional one or two segments change the aspect ratio of the manipulated image to 4:3, which can be processed according to H.261 or H.263 without 'Custom Picture Format' capability. The total height of the additional segments can be one third of the height of the composite 16:9 image. The manipulated, uncompressed video is encoded and transmitted to the endpoint. At the endpoint, the 4:3 compressed image is decoded and transferred to the wide screen display. The wide screen display set by the user to zoom mode symmetrically enlarges the manipulated image to substantially cover the width of the wide screen display. The additional segments with the background color are cropped, and a full screen of the composite image with an aspect ratio of 16:9 is substantially displayed on the wide screen display.

In another embodiment of manipulating or altering the video image, the disclosed system and method generates an uncompressed video image having the aspect ratio of 16:9. Then, the video image is distorted by a scaler. The scaler increases the resolution of a height of the image by a factor of four thirds, creating a manipulated uncompressed video having the aspect ratio of 4:3. The manipulated image is encoded and transmitted to the endpoint. The endpoint decodes the manipulated image and delivers it to the wide screen display. The wide screen display is set to the wide setting in which the manipulated image is asymmetrically enlarged by four thirds. This asymmetric enlargement corrects the previous distortion, which was done prior to encoding the video image. As a result, the wide screen display substantially displays the image without distortion and with the aspect ratio of 16:9 on the wide screen.

The foregoing summary is not intended to summarize each potential embodiment or every aspect of the present disclosure. Other features and advantages of the present invention will become apparent upon reading the following detailed description of the embodiments with the accompanying drawings and appended claims.

BRIEF DESCRIPTION OF THE DRAWINGS

The foregoing summary, exemplary embodiments, and other aspects of subject matter of the present disclosure will be best understood with reference to a detailed description of specific embodiments, which follows, when read in conjunction with the accompanying drawings, in which.

Figure 1A:
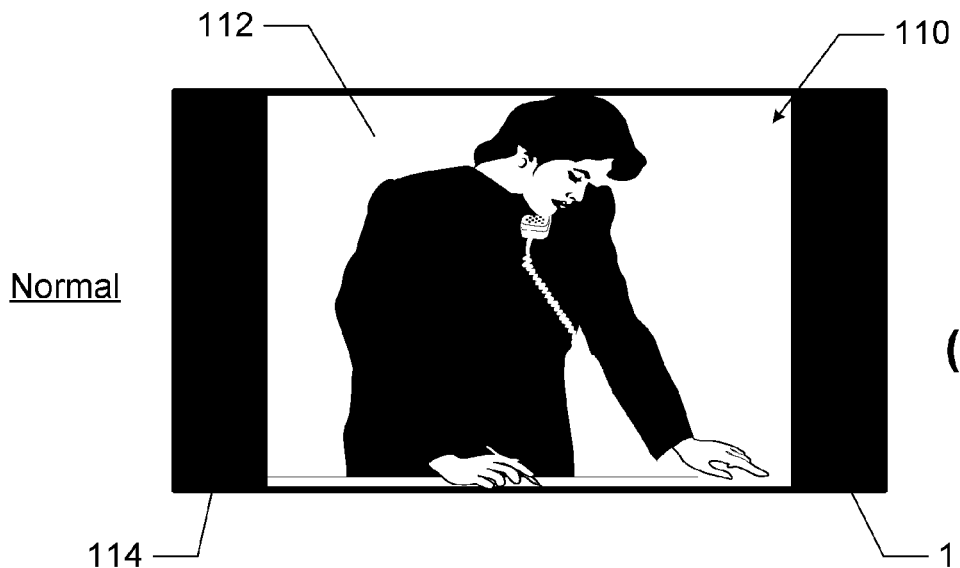
FIGS. 1A-1C illustrate examples of how a video image having an aspect ratio of 4:3 is displayed on a wide screen display using different settings.

While the disclosed system and method are susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring now to the drawings, in which like numerals refer to like parts throughout the several views, exemplary embodiments of the present disclosure are described.

Figure 2:
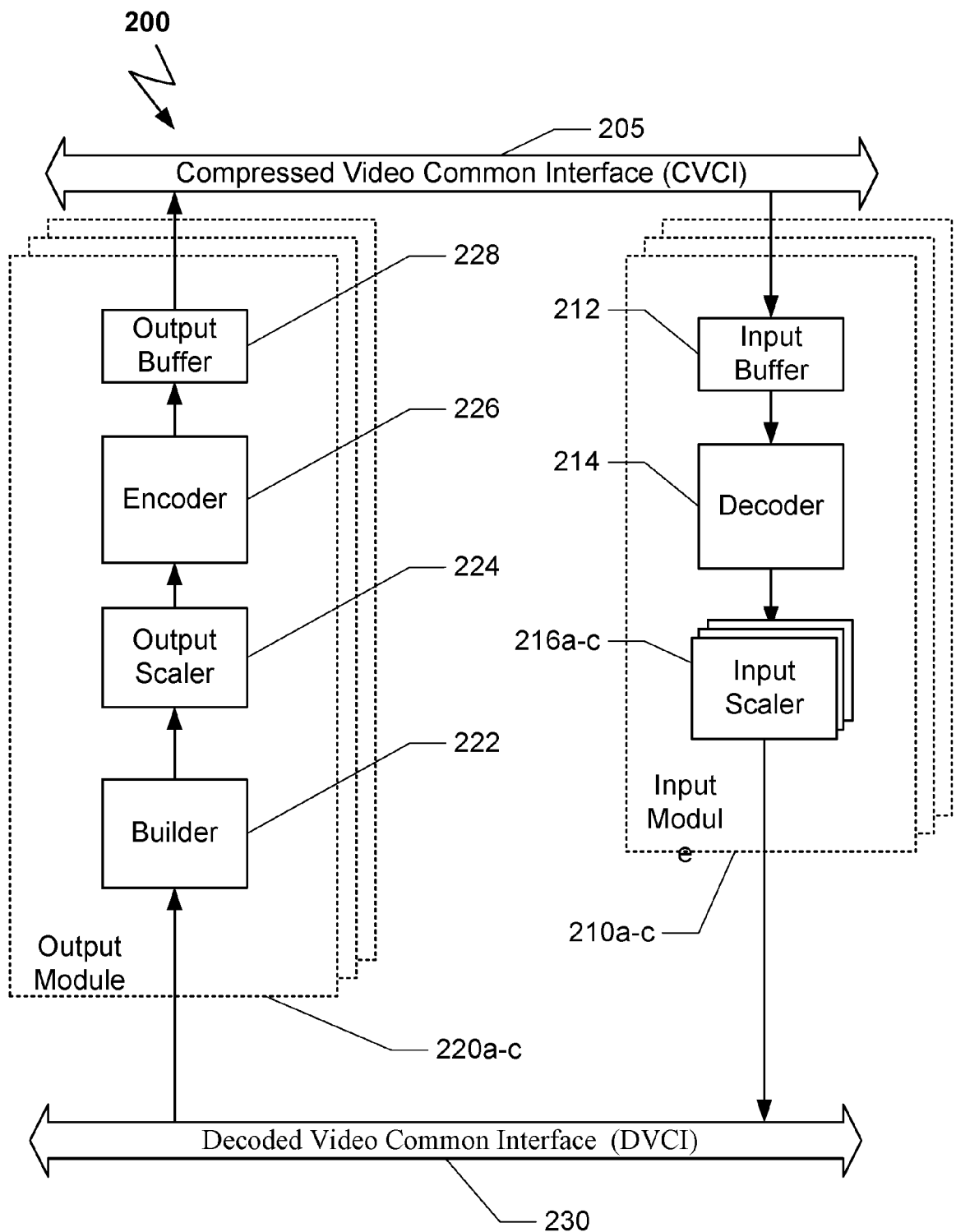
FIG. 2 is a block diagram illustrating an exemplary embodiment of a video unit within a VCCU.

FIG. 2 is a block diagram showing some of the logical elements of an exemplary video unit 200 within a VCCU. The video unit 200 processes and prepares compressed video images for transmission to an endpoint (not shown) having a wide screen display (not shown). In the present embodiment, the video unit 200 includes a compressed video common interface (CVCI) 205; a plurality of input modules 210a-c; a plurality of output modules 220a-c; and a Decoded Video Common Interface (DVCI) 230. Each input module 210a-c includes an input buffer 212, a decoder 214, and one or more input scalers 216a-c. Each output module 220a-c includes a builder 222; an output scaler 224; an encoder 226; and an output buffer 228. Three units of input modules 210a-c, scaler 216a-c and output module 220a-c are shown in FIG. 2 by way of example. It is understood that the disclosed system and method can be used with any number of modules. In addition, it is understood that other video units within a VCCU may have a different configuration than that schematically shown and described here.

A plurality of endpoints or terminals (not shown) is connected over one or more communication networks (not shown) to the VCCU. It should be noted that the terms "endpoints" and "terminals" may be used interchangeably herein. The endpoints send their compressed video streams to the appropriate input modules 210a-c via Network Interface Modules (not shown) and the CVCI 205. Also, the endpoints receive the compressed video streams from the appropriate output modules 220a-c via Network Interface Modules (not shown) and the CVCI 205. The communication networks can be packet-based networks, circuit switched networks, and/or other networks or communication protocols, such as ISDN, ATM, PSTN, cellular and/or IP. The disclosed system and method is not limited to a particular type of communication protocol or type of network.

The CVCI 205 routes the compressed video streams between the input modules 210a-c, the output modules 220a-c, and the network interface modules (not shown). The CVCI 205 can be a TDM bus, packet based bus (such as an ATM bus, IP bus), serial bus, parallel bus, connection switching, shared memory, direct connection, or any variety of these. The operation of the video unit 200 is controlled by a central control unit (not shown). The central control unit can be a host computer or internal module of the VCCU. In the present disclosure, the central control unit is referred to as a management conference system (MCS).

Each input module 210a-c and/or output module 220a-c can be a logical unit, a hardware module, a firmware module, a software module, or any combination of these. Each module 210a-c, 220a-c can be a permanent logical module or a temporary one, which is generated by the MCS according to current needs. Generating temporary logical modules and allocating permanent modules according to the current needs conserves the resources of the VCCU.

The number of the input modules 210a-c that may be associated with a video conference can be a fixed number or can be varied according to the needs of the video conference. For example, a video conference may need one input module 210 for each of the endpoints participating in the video conference. In another video conference, one input module 210 can be used for each currently visible participant in the relevant screen layout.

Each video conference can be associated with one or more output modules 220a-c. In an exemplary embodiment of the disclosed system, one output module 220 is used for each of the endpoints participating in the video conference. In an alternative embodiment, one output module 220 can be used for each type of screen layout, and each output module 220 can transfer its output to the endpoints that are using the particular type of layout. Allocation of the output modules 220 can depend on various parameters known in the art, including but not limited to bit rate, frame rate, and coding algorithm, for example.

Once a compressed input video stream from an endpoint associated with a certain input module 210 is placed onto the CVCI 205, the input video stream begins to accumulate in the input buffer 212. The accumulation in the buffer 212 is done according to the type of the CVCI 205. For example, if the CVCI 205 is a TDM bus, then the buffer 212 grabs the appropriate input stream by sampling the CVCI 205 at the time slot assigned to the endpoint associated with the input module 210. However, the buffer 212 may not be necessary, and other embodiments of the disclosed system may accumulate the appropriate compressed input stream by other techniques known in the art.

The decoder 214 takes the received compressed video stream from input buffer 212. Based on the encoding standards (H.261, H.263, H.264, etc.) of the compressed video stream, the decoder 214 decodes the compressed video stream into an uncompressed video, which can then be represented in the image (spatial) domain.

The output from the decoder 214 is transferred from the decoder 214 to one or more input scalers 216a-c. The number of input scalers 216 depends on the number of different segment sizes to which the uncompressed video is assigned in the different layouts of the conference. The scaling performed by the input scalers 216a-c changes the resolution of the uncompressed video according to the requirements of the endpoints and/or according to the size of the associated segments. The input scalers 216a-c can also perform known filter operations on the scaled, uncompressed video to preserve the picture quality. The output of the input scalers 216a-c is transferred to the Decoded Video Common Interface (DVCI) 230. The input scalers 216a-c can be connected to the DVCI 230 via a buffer (not shown), and the transfer of the uncompressed video can performed according to the type of DVCI used for the disclosed system. For example, if the DVCI 230 is a TDM bus, then a decoded stream from an input scaler 216*a-c* can be transferred to the DVCI 230 during a time slot associated with the particular decoded stream.

In an alternative embodiment of the disclosed system, the input modules 210*a-c* may not include input scalers 216. Instead, the decoded stream from the decoder 214 can be transferred directly or via a buffer (not shown) to the DVCI 230. The builder 222 on the output module 220*a-c* can then perform the various functions of the input scalers 216.

In the present embodiment, the DVCI 230 routes the decoded video between the input modules 210*a-c* and the output modules 220*a-c*. The DVCI 230 can be a TDM bus, packet-based bus, serial bus, parallel bus, connection switching, shared memory, direct connection, or any variety of these. In alternative embodiments, the disclosed system can use the CVCI 205 for the same functions as the DVCI 230.

The builders 222 on the appropriate one or more output modules 220*a-c* retrieve one or more scaled decoded video (uncompressed video) segments from the DVCI 230. The selection of the decoded video segments is based on the layout needed to be generated by the output module 220. The builder 222 collects decoded video segments from one or more input module 210*a-c* as needed by the layout. The builder 222 then arranges the decoded video segments according to the layout of the video conference to create a composite frame. In other embodiments of the disclosed system, the builder 222 can scale the received decoded frame to fit the size of its associated segment in the layout of the video conference. The aspect ratio of the output frame at the output of builder 222 can be about 4:3 or 16:9 depending on the aspect ratio of the display used by the endpoint associated with the relevant output module 220.

To create a composite frame having an aspect ratio of about 16:9 from two or more segments that each have an aspect ratio of about 4:3, the disclosed system scales each one of the segments and places each scaled segment in the layout in such a way that the composite layout has an aspect ratio of about 16:9. Referring to FIGS. 3A-3D, embodiments of exemplary layouts 320, 330, 340 and 350 for creating a composite frame from scaled segments are schematically illustrated. In each of the exemplary layouts 320, 330, 340, and 350, a composite frame 322, 332, 342, and 352 with an aspect ratio of about 16:9 is divided into an integer number of segments having the aspect ratio of about 4:3. For example, the layout 320 of FIG. 3A has a composite frame 322 composed of twelve segments (320*a* to 320L) with each segment having an aspect ratio of about 4:3 and the segments arranged in a 4×3 matrix.

Figure 3A:
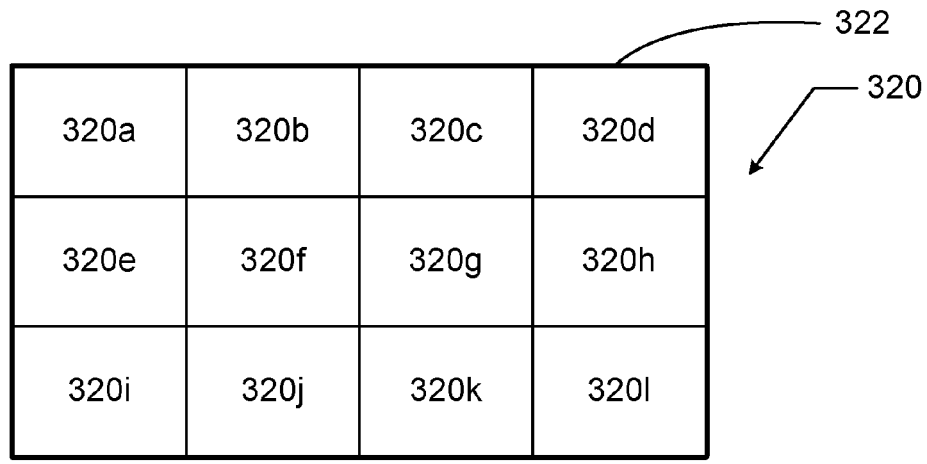
FIGS. 3A-3F illustrate exemplary layouts that may be used with a wide screen display.
Figure 3B:
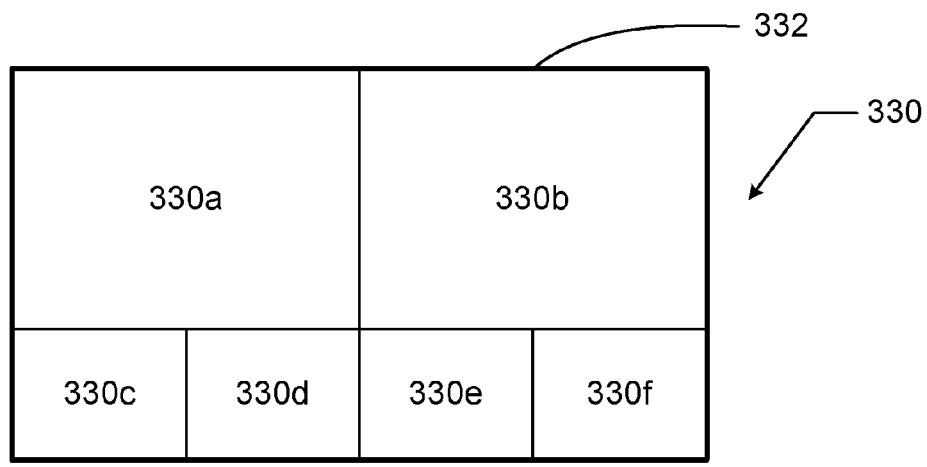
Figure 3C:
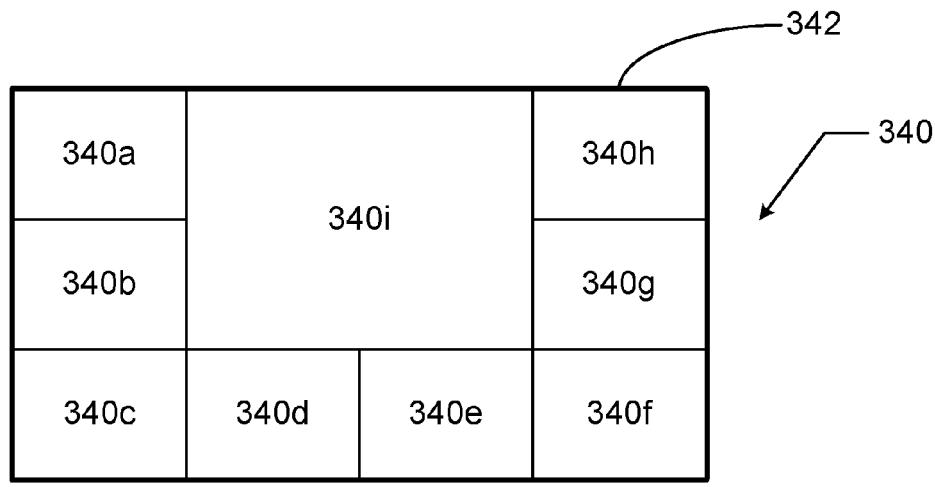
Figure 3D:
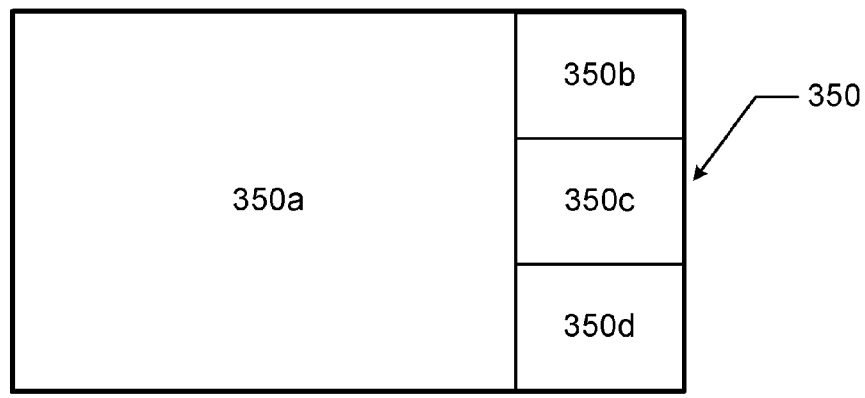

The layout 320 of FIG. 3A can be used as a basic layout from which additional layouts with integer numbers of 4:3 segments can be composed to generate an overall layout of about 16:9. For example, the other layouts 330, 340 and 350 in FIGS. 3B-3D illustrate derivatives of layout 320 and have different combinations of the basic division of twelve shown in the layout 320. These other layouts 330, 340 and 350 can be used in other conferences according to the needs of the video conference.

Figure 3E:
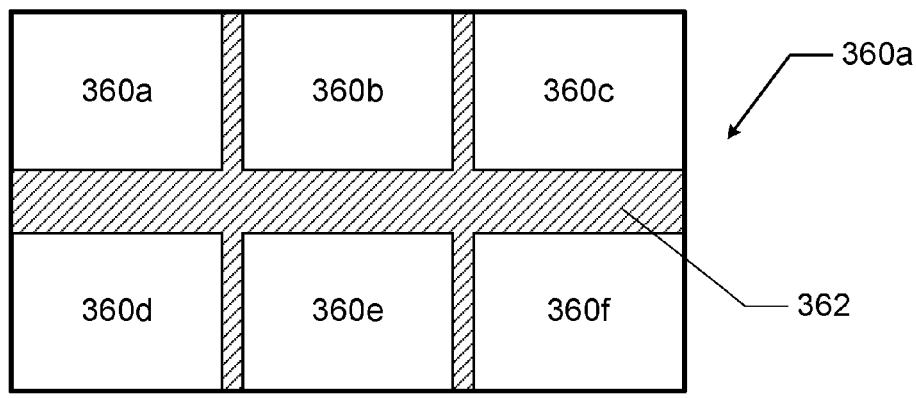

Some video conferences may require layouts where an integer number of segments having aspect ratios of about 4:3 will not cover the entire 16:9 display screen. For example, a video conference may require a layout having six segments that are equal in size. In one embodiment, the disclosed system can create a layout 360*a* shown n FIG. 3E. Each segment 360*a* to 360*f* of the layout 360*a* has an aspect ratio of about 4:3, and the uncovered area 362 is filled with background.

Figure 1B:
Figure 1C:
Figure 3F:
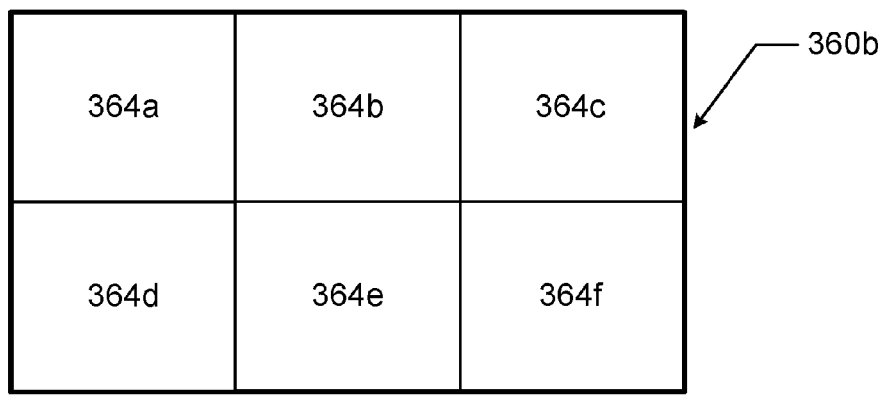

In an alternative embodiment, the disclosed system can create a layout 360*b* shown in FIG. 3F when a video conference requires a layout having six segments that are equal in size. The disclosed system scales each of the six segments 364*a* to 364*f* such that the total area covered by the six segments is bigger than the 16:9 frame. Then, the edges of each segment may be cropped to reduce the total size to fit the frame. In layout 360*b*, each segment 364*a* to 364*f* has been scaled and cropped. Since the cropped area is divided over the six segments 364*a* to 364*f* it is less disturbing than cropping portions of the entire frame as seen in the example of FIG. 1B. The above technique of scaling and cropping the segments may be used if one or more inputs have an aspect ratio other than 4:3 (e.g., 16:9).

Returning to FIG. 2, one or more input scalers 216*a-c* in some embodiments of the disclosed system can be adjusted to scale the decoded video generated by the decoder 214 to the appropriate one or more sizes of the image in different layouts. Other embodiments of the disclosed system can have one or more scalers integrated into the builder 222 rather than having separate input scalers 216*a-c*. The builder 222 can be adjusted to place the appropriate decoded streams in their location in the layouts.

After the builder 222 creates the composite frame of the video image, the output scaler 224 in the present embodiment then scales the video image to the desired resolution and transfers the scaled video image to the encoder 226. If the endpoint associated with the output module 220 has a wide screen display but the endpoint cannot process a video image having an aspect ratio of 16:9, additional manipulation is required to convert the video image from the aspect ratio of about 16:9 to 4:3 before transferring the image to the encoder 226.

In one embodiment of manipulating or altering the video image discussed in more detail below with reference to FIGS. 4A-4C, the builder 222 adds a rectangular segment to the height of the composite image. The height of this additional rectangular segment can be one third of the height of the composite image. This additional rectangular segment can be divided into two halves. One half can be placed above the composite image, and the other can be placed below the composite image. The additional rectangular segments can be filled with background color.

In another embodiment of manipulating or altering the video image discussed in more detail with reference to FIGS. 5A-5C, the output scaler 224 distorts the image by enlarging an original height H of the image by a factor of 4/3 compared to the width of the image. This scaling converts the aspect ratio from about 16:9 to about 4:3. As noted above, some embodiments of the disclosed system may not require output scalers 224 in which case one or more input scalers 216*a-c* can distort the decoded image instead of an output scaler In the present embodiment, the encoder 226 receives the scaled composite image from the output scaler 224 or builder 222. The encoder 226 encodes the scaled composite image according to the compression algorithm used by the one or more endpoints associated with the encoder 226. For example, the compression algorithm can be H.261, H.263, H.264, etc., which are known in the art and not discussed herein. The compressed video stream of the image is then transferred via the output buffer 228, the CVCI 205, and one or more network interface modules (not shown) to the appropriate endpoints (not shown).

Other details of the video unit 200 can be found in U.S. Pat. Nos. 5,600,646; 5,838,664; and 6,300,973, which are incorporated herein by reference in their entireties. Additional details can also be found in U.S. Patent Application Publication No. 20040042553, which has Ser. No. 10/344,792 and is incorporated herein by reference in its entirety.

Figure 4A:
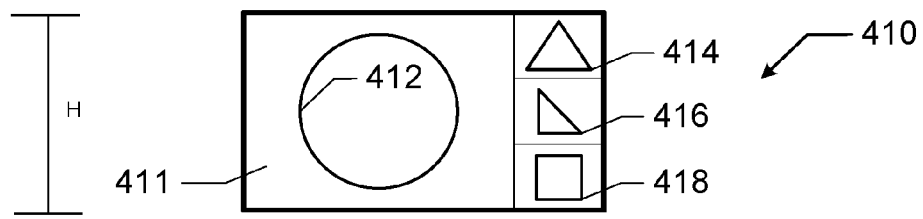
FIGS. 4A-4C illustrate an exemplary video image in three different stages of processing to be displayed over a wide screen display set to a zoom mode.
Figure 4B:
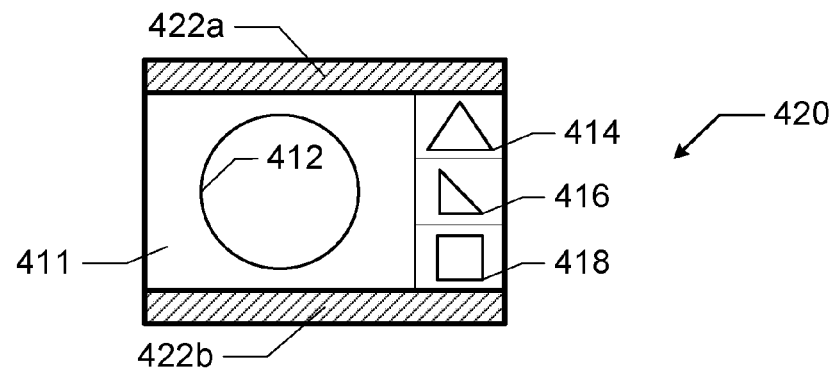
Figure 4C:
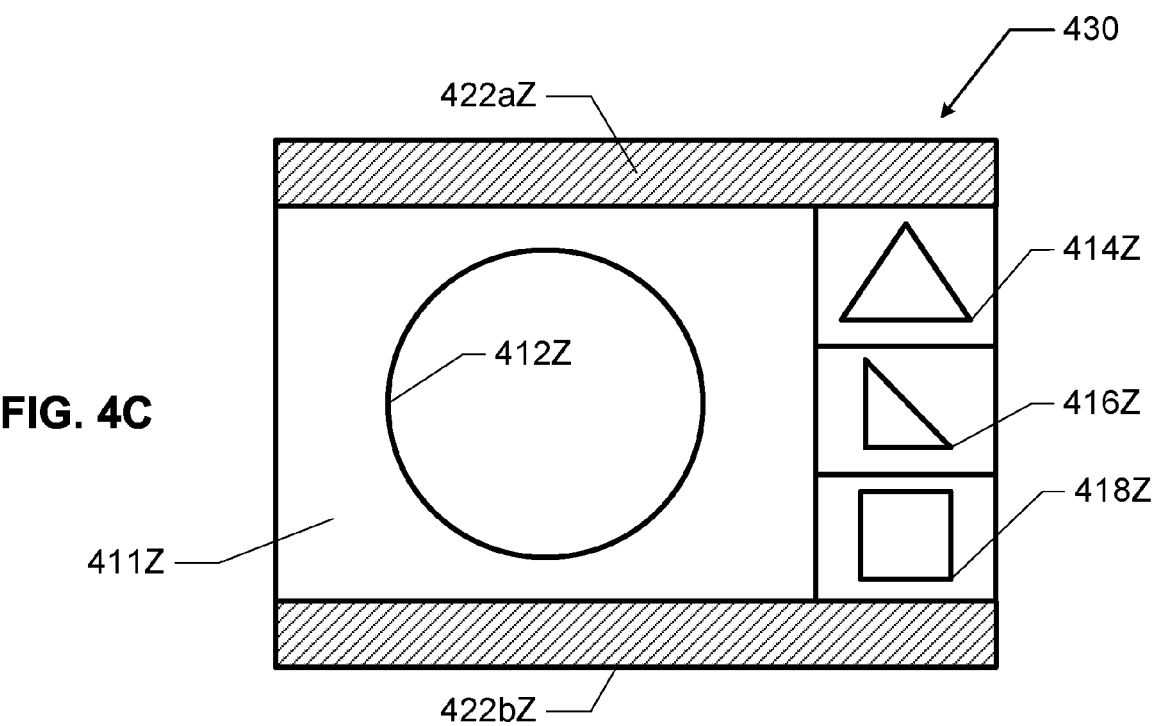

FIGS. 4A-4C illustrate an example video image during three different processing stages of a composite image. FIG. 4C illustrates the operation and the output over the wide screen in the endpoint. Because the endpoint associated with a wide screen display may not be capable of receiving 16:9 video images, the video image is manipulated or altered to be displayed on the wide screen display set to the zoom mode. In the zoom mode, the image is enlarged symmetrically to be display over substantially the entire wide screen of the display.

The builder 222 (FIG. 2) composes an example composite image 410, as shown in FIG. 4A. The composite image 410 has four segments, which include a large segment 411 and three small segments 414, 416 and 418. The large segment 411 can be associated with the current speaker in the video conference, and the other segments can be associated with the rest of the participants of the video conference. The builder 222 (FIG. 2) collects the video data of the different segments 411, 414, 416, and 418 from the decoded video common interface 230 (FIG. 2). The builder 222 (FIG. 2) then composes one frame 410 with an aspect ratio of 16:9 using the different segments 411, 414, 416, and 418, where each one of the segments 411, 414, 416, and 418 has an aspect ratio of 4:3.

Next, the builder 222 (FIG. 2) manipulates the composite video to produce an image 420 of FIG. 4B where the aspect ratio of the entire image is about 4:3. The manipulated image 420 can be transmitted to an endpoint using a wide screen display where the endpoint is capable of handling incoming streams having an aspect ratio of about 4:3. To convert the aspect ratio to 4:3, the builder 222 (FIG. 2) adds two rectangular segments 422*a* and 422*b* to form the manipulated composite image 420. Each of the additional segments 422A and 422B can be filled with a background color. The total height of both of the additional rectangular segments 422A and 422B is equal to about a third of the original height H of the composite image 410. The composite image 410 together with the two rectangular segments 422A and 422B create a manipulated and uncompressed video (decoded video) having the aspect ratio of about 4:3.

The image 420 of FIG. 4B is transferred via the output scaler 224 (FIG. 2) to the encoder 226 (FIG. 2). The image 420 is compressed according to the compression standard used by the receiving endpoint (not shown) and is sent as a compressed video to the endpoint. At the endpoint, the compressed video is decoded. The manipulated decoded video has the same image and aspect ratio as the image 420.

As shown in FIG. 4C, the manipulated and decoded video from the endpoint is transferred to the wide screen display. The wide screen display, which has been set to the zoom mode, receives the manipulated decoded video having the aspect ratio of about 4:3. In the wide screen display, the image is then symmetrically enlarged to reach the entire width of the wide screen display. Since the height of the manipulated image is greater then the height of a conventional 16:9 image, the two rectangles 422*a*Z and 422*b*Z overflow beyond the size of the wide screen display and are not shown on the display. The result is that only the area 411Z, which represents the original 16:9 composite image 410 of FIG. 4A, is displayed over the wide screen display.

Figure 5A:
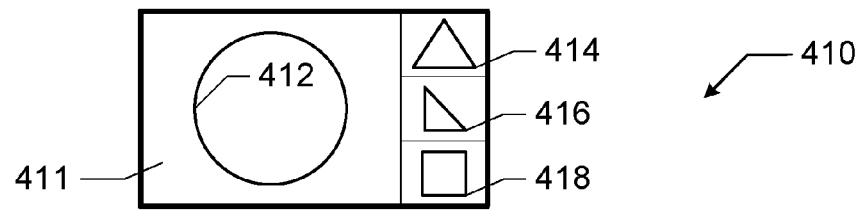
FIGS. 5A-5C illustrate an exemplary video image in three different stages of processing to be displayed over a wide screen display set to a wide mode.
Figure 5B:
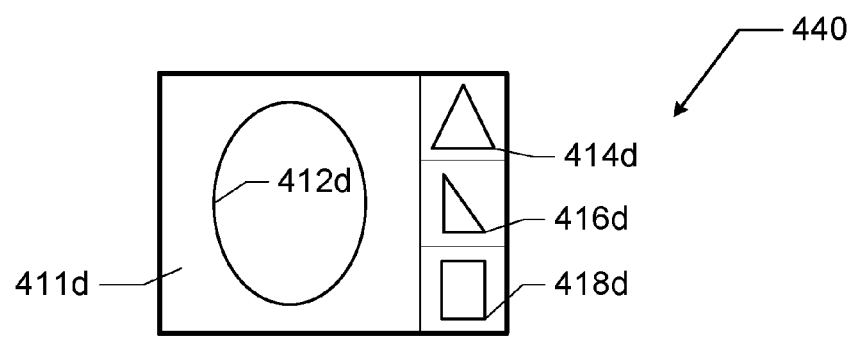
Figure 5C:
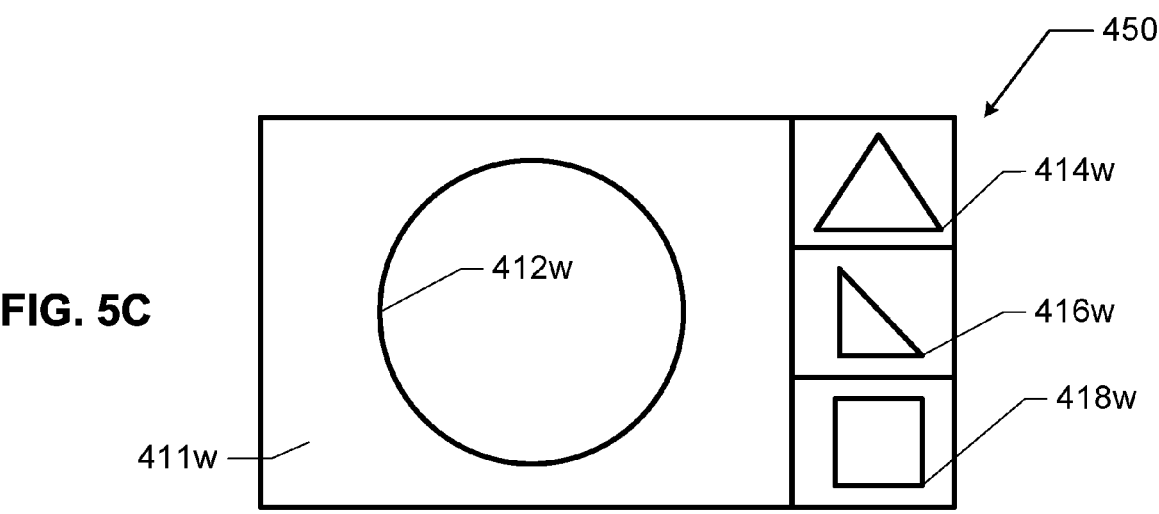

FIGS. 5A-5C illustrate an example video image during three different processing stages of a composite image. In this example, the image is processed for display over a wide screen display while the wide screen is adjusted to the wide mode. In wide mode, the video image is asymmetrically enlarged by the wide screen display so that the image can be displayed substantially over the entire screen.

In FIG. 5A, the image 410 is the same image discussed previously in FIG. 4A. Image 410 is a composite image having the aspect ratio of 16:9 at the output of the builder 222 (FIG. 2). The composite image is transferred to output scaler 224 (FIG. 2). The output scaler 224 (FIG. 2) is set to asymmetrically scale the image by increasing an original height H of the image by a factor of 4/3. As a result, a distorted and manipulated image 440 shown in FIG. 5B is produced that has the aspect ratio of 4:3. It can be observed that the image 440 is distorted or pulled up. For example, a circle 412 becomes an ellipse 412*d*, and a square 418 becomes a rectangle 418*d*.

The manipulated (distorted) image 440 is encoded by the encoder 226 (FIG. 2) and is transmitted to the endpoint (not shown). At the endpoint, the compressed video is decoded. Decoding at the endpoint produces an uncompressed video image, which is still distorted and has the same shape as the manipulated video 440. The distorted image is then transferred to the wide screen display associated with the endpoint. As shown in FIG. 5C, the wide screen display, which has been set to wide mode, asymmetrically enlarges the image. To substantially cover the entire wide screen, the width of the manipulated video 440 is enlarged by a factor of 4/3. This asymmetrical enlargement corrects the distorted image 440 and generates undistorted image 450 having the ratio of about 16:9 that substantially covers the entire wide screen. It can be seen that over the wide screen the circle 412*w* and square 418*w* have been corrected and have the same shape as it was in the original composite image 410.

Figure 6:
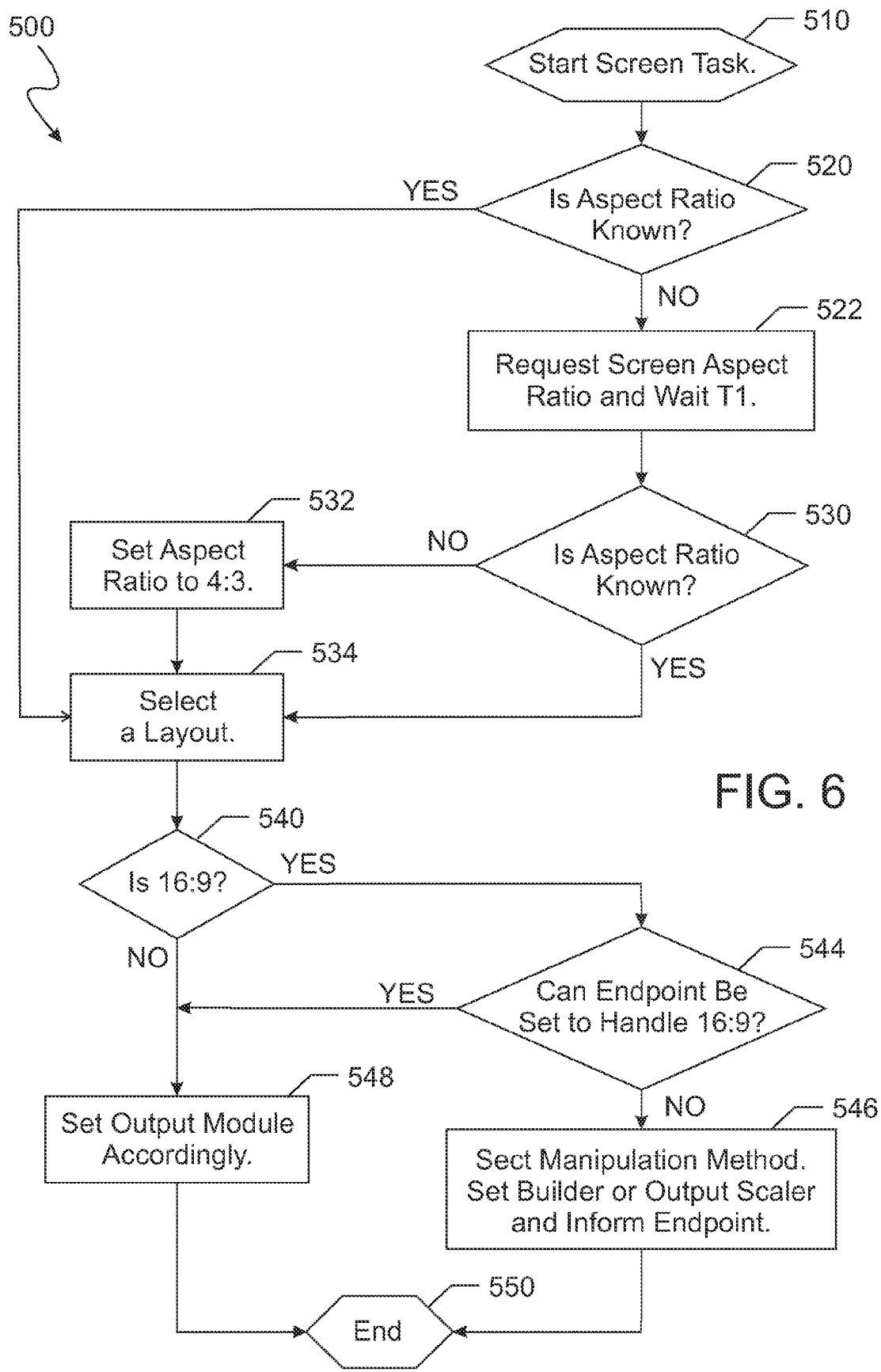
FIG. 6 is a flowchart showing an exemplary method for setting a video unit for preparing compressed video stream to be sent and displayed over a wide screen display.

FIG. 6 is a flow chart showing steps of an exemplary method 500 for setting a video output module 220 (FIG. 2) to prepare a compressed video stream for display on a wide screen display. The disclosed method 500 can be preformed by the Management Conference System (MCS) (not shown), which is associated with the VCCU. The disclosed method 500 can be used to set the builder 222, the output scaler 224, and/or the input scalers 216*a-c* of FIG. 2. The disclosed method 500 is initiated at a start screen task 510 for each one of the endpoints associated with a video conference during establishing the connection with the endpoint. The task 500 obtains the particular parameters of the endpoint.

At step 520, a decision is made whether the aspect ratio of the display of the endpoint is known to the VCCU. The aspect ratio may be known, for example, if during reserving the video conference one of the parameters being loaded or mentioned during the reservation of the video conference is the aspect ratio of the display being used by the endpoint. In some cases, the endpoint can implement a configuration interface, in which the type of the display and its mode of operation (Normal, Wide, Zoom) is declared. The endpoint can declare the information on the wide screen as part of its set of capabilities. If the aspect ratio of the display is known, the disclosed method 500 proceeds to step 534. If the aspect ratio of the endpoint is not known at step 520, then the VCCU may request at step 522 that the user associated with the relevant endpoint define the aspect ratio of the display for the endpoint. A waiting period T1 may be taken at step 522 for a response. The waiting period T1 may be in the range of a few seconds to a few minutes. Requesting the aspect ratio may be transferred to the user by different techniques as are disclosed below.

In one exemplary technique of determining the aspect ratio of the display associated with an endpoint, the disclosed method can create a video message. The video message may be embedded with the video signal and may request the user to define the type of screen by selecting one of displayed options. The response of the user may be done by pressing the appropriate button on the remote control of the endpoint and sending DTMF signals. Other exemplary techniques may use other types of signaling, including but not limited to FECC (ITU standard H.281). More information on video message techniques is disclosed in US Patent Application Publication No. 20030174202, which has Ser. No. 10/346,306 and has been incorporated herein by reference in its entirety.

In other exemplary embodiments of determining the aspect ratio of the display associated with an endpoint, the disclosed method 500 can initiate an Interactive Voice Response (IVR) session during step 522. The IVR session can request the user to select one of the two options for defining the type of screen being used. The user may respond again by pressing the appropriate key in the remote control at the endpoint and sending DTMF signals back to the VCCU. The DTMF signals can be embedded and added to the audio signals generated at the endpoint. Alternatively, the DTMF signals can be out-of-band by using known out-of-band signaling, such as IETF RFC 2833. Other embodiments of the disclosed method 500 may use other techniques known in the art to inform the VCCU about the type of display associated with the endpoint. These other techniques can include but are not limited to FECC or speech recognition techniques.

At step 530, a decision is made whether the aspect ratio is known. If the aspect ratio is known at step 520 or a response was received at step 530, then the disclosed method 500 proceeds to step 534. The aspect ratio may still be unknown at step 530 if the user has not responded during the period of T1 or if the user is not aware of the type of screen being used. In addition, the aspect ratio may still be unknown at step 530 if the disclosed method 500 does not include step 522. Nevertheless, the disclosed method 500 can proceed to step 532 where method 500 assumes that the aspect ratio of the display used with a current endpoint is 4:3.

At step 534, a layout is selected from one or more group of layouts. The layouts are prepared in advance by a designer. The designer can create a plurality of layouts by using similar techniques to those disclosed above in conjunction with FIGS. 3A-3F, for example. Each layout matches certain layout parameters. The layout parameters can include: the display aspect ratio, the number of segments, and the location of the segments in the layout, and the relation between the sizes of the different segments in the layout, among other parameters. For each type of layout, the MCS contains the setting of certain elements in the video unit 200 (FIG. 2). For example, the MCS can contain the settings of the scalers and/or the builder. A variety of layouts matching the relevant aspect ratio of the display can be selected from the group of layouts. The user can select the preferred layout by using the video message techniques, such as those disclosed in U.S. Patent Application Publication No. 20030174202, which has Ser. No. 10/346,306 and has been incorporated herein by reference in its entirety.

Next, a decision is made at step 540 whether the aspect ratio of the display is 16:9. If the ratio is 16:9, then a decision is made at step 544 whether the relevant endpoint can handle an image with an aspect ratio of 16:9. An endpoint can handle an aspect ratio of 16:9 if it uses compression standards such as H.264 or H.263 with a capability of using custom picture format. On the other hand, the endpoint may not handle the aspect ratio of 16:9, because the endpoint is limited and can handle only compression algorithms such as H.261 or H.263 without custom picture format. If it is determined at step 544 that the endpoint can handle an image having the aspect ratio of 16:9, then the disclosed method 500 may proceed to step 548 where the output module is set accordingly. If it is determined at step 544 that the endpoint cannot handle the aspect ratio of 16:9, then the disclosed method 500 proceeds to step 546 where the type of the manipulation technique is selected.

At step 546, the disclosed method 500 can add one or more rectangular segments to increase the height of a video image and change the aspect ratio of 16:9 to 4:3, according to the manipulation technique disclosed above in conjunction with FIGS. 4A-4C. Alternatively, the disclosed method 500 can distort the composite image by increasing an original height by a factor of 4/3 compared to the width, such as disclosed above in conjunction with FIGS. 5A-5C. The builder 222 (FIG. 2) is set according to the selected manipulated technique. For example, if the selected manipulated technique includes adding the rectangular segments, then the builder 222 (FIG. 2) may be set to add these rectangular segments. If the other technique is selected, then the output scaler 224 (FIG. 2) may be adjusted to distort the image by increasing the height by a factor of 4/3 compared to the width. Then, the builder 222 and the output scaler 224 (FIG. 2) may receive all the parameters associated with the decoded streams that compose the composite image. Among others, the parameters may include information for receiving the decoded streams from DVCI 230 (FIG. 2) and the location in the layout in which each one of the decoded video has to be placed in order to create the composite 16:9 layout. If the display mode is known, (wide or zoom) then the modification technique may be selected accordingly.

After setting the builder and/or the scaler, a message can be sent to the endpoint. The message may be embedded in the video or can be issued as an audio message, informing the user to set the wide screen display to the appropriate mode. For example, if the distortion technique has been selected, then the user is instructed to set the wide screen display to the wide mode. However, if the technique of adding rectangular segments has been selected, then the user is instructed to set the wide screen display to the zoom mode. After instructing the user to set the wide screen display, the disclosed method 500 is terminated at step 550 for this endpoint. If needed, the disclosed method 500 can be restarted at step 510 for the next member of the video conference.

The step 548 of setting the output module can be used in one of two cases. In a first case, step 548 is initiated if it is determined at step 540 that the display has a common aspect ratio of 4:3. In this first case, there is no need for a special modification of the decoded video to prepare it to be displayed. Therefore, the output module 220 (FIG. 2) can be set accordingly. In a second case, step 548 is initiated if it is determined at step 544 that the endpoint can handle images having the aspect ratio of 16:9. In this second case, there is no need for a special modification of the decoded video in the output module 220 to prepare it to be displayed on a wide screen. Therefore, in both cases, the disclosed method 500 proceed to step 548 where the output module 220 (FIG. 2) is set according to the appropriate standard for composing and encoding the composite image and transmitting it to the endpoint. After setting the output module according to the appropriate standard, the disclosed method 500 is terminated at step 550.

In this application the words "unit" and "module" may be used interchangeably. Anything designated as a unit or module may be a stand-alone unit or a specialized module. A unit or module may be modular or may have modular aspects allowing it to be easily removed and replaced with another similar unit or module. Each unit or module may include any one or combination of software, hardware, or firmware.

Those skilled in the art will appreciate that the disclosed system and method can be implemented in the form of additional software residing in the VCCU that performs the techniques disclosed in the present application. In addition, those skilled in the art will appreciate that the disclosed system and method can be implemented in the form of additional hardware added to the VCCU or distributed among the VCCU and the endpoints that performs the techniques disclosed in the present application.

Furthermore, those skilled in the art will appreciate that the disclosed system and method can be used with a variety of compression standards, including but not limited to: H.264, H.263, H.261, MPEG 1, MPEG 2, and MPEG 4. More information on these standards may be obtained from the International Telecommunications Union (ITU) website at URL:// http://www.itu.int/ or from the website at URL://http:// www.mpeg.org/.

In the description and claims of the present disclosure, each of the verbs, "comprise," "include," and "have," and conjugates thereof, are used to indicate that the object or objects of the verb are not necessarily a complete listing of members, components, elements, or parts of their respective subjects or verb.

The foregoing description of preferred and other embodiments is not intended to limit or restrict the scope or applicability of the inventive concepts conceived of by the Applicant. In exchange for disclosing the inventive concepts contained herein, the Applicant desires all patent rights afforded by the appended claims. Therefore, it is intended that the present invention include all modifications and alterations to the full extent that they come within the scope of the following claims or the equivalents thereof.

What is claimed is:

1. A method of composing a video layout, comprising:
    receiving at an MCU a plurality of compressed video streams from a plurality of endpoints;
    decoding of the compressed video streams;
    scaling of the decoded video streams;
    selecting from the decoded and scaled video streams a plurality of scaled video segments, at least one of the scaled video segments having an aspect ratio of about 4:3; and
    composing an integer number of the selected scaled video segments in a video layout having an aspect ratio of about 16:9, preserving the aspect ratio of the selected scaled video segments.

2. The method of claim 1, wherein each of the scaled selected scaled video segments has an aspect ratio of about 4:3.

3. The method of claim 2, wherein the video layout comprises twelve scaled video segments arranged in a 4×3 matrix.

4. The method of claim 2, wherein the video layout comprises two large scaled video segments and four small scaled video segments and wherein the area of each of the large scaled video segments is about four times the area of each of the small scaled video segments.

5. The method of claim 2, wherein the video layout comprises one large scaled video segment and eight small scaled video segments and wherein the area of the large scaled video segment is about four times the area of each of the small scaled video segments.

6. The method of claim 2, wherein the video layout comprises one large scaled video segment and three small scaled video segments and wherein the area of each of the large scaled video segments is about nine times the area of each of the small scaled video segments.

7. The method of claim 1, further comprising transmitting the video layout to an endpoint.

8. The method of claim 7, wherein the endpoint comprises a 16:9 display and a codec that is not capable of processing a 16:9 video image.

9. The method of claim 8, further comprising, prior to transmitting the video layout to the endpoint, converting the video layout from 16:9 to 4:3.

10. The method of claim 9, wherein converting the video layout from 16:9 to 4:3 comprises adding a rectangular segment of height to the layout, wherein the rectangular segment of height is filled with a background color.

11. The method of claim 10, wherein one half of the added rectangular segment of height is added above the video layout and one half of the added rectangular segment of height is added below the video layout.

12. The method of claim 9, wherein converting the video layout from 16:9 to 4:3 comprises distorting an original height of the 16:9 video image by a factor of about 4/3.

13. The method of claim 1, further comprising transmitting an instruction to the endpoint to set the 16:9 display to a zoom mode.

14. A method of composing a video layout, comprising:
    receiving at an MCU a plurality of compressed video streams from a plurality of endpoints;
    decoding of the compressed video streams;
    scaling of the decoded video streams;
    selecting from the decoded and scaled video streams a plurality of scaled video segments, at least one of the scaled video segments having an aspect ratio of about 4:3; and
    composing an integer number of the selected scaled video segments in a video layout having an aspect ratio of about 16:9;
    transmitting the video layout to an endpoint comprising a 16:9 display and a codec that is not capable of processing a 16:9 video image; and
    converting the video layout from 16:9 to 4:3, comprising:
        adding a rectangular segment of height to the layout, wherein the rectangular segment of height is filled with a background color, prior to transmitting the video layout to the endpoint.

15. The method of claim 14, wherein the act of adding a rectangular segment of height to the layout, wherein the rectangular segment of height is filled with a background color, prior to transmitting the video layout to the endpoint comprises:
    adding one half of the rectangular segment of height above the video layout; and
    adding one half of the rectangular segment of height below the video layout.

16. A method of composing a video layout, comprising:
    receiving at an MCU a plurality of compressed video streams from a plurality of endpoints;
    decoding of the compressed video streams;
    scaling of the decoded video streams;
    selecting from the decoded and scaled video streams a plurality of scaled video segments, each of the scaled video segments having an aspect ratio of about 4:3; and
    composing an integer number of the selected scaled video segments in a video layout having an aspect ratio of about 16:9, comprising one or more large scaled video segments and a plurality of small scaled video segments, wherein the area of each of the large scaled video segments is approximately an integral multiplier of the area of each of the small scaled video segments.

17. The method of claim 16, wherein the video layout comprises two large scaled video segments and four small scaled video segments and wherein the area of each of the large scaled video segments is about four times the area of each of the small scaled video segments.

18. The method of claim 16, wherein the video layout comprises one large scaled video segment and eight small scaled video segments and wherein the area of the large scaled video segment is about four times the area of each of the small scaled video segments.

19. The method of claim 16, wherein the video layout comprises one large scaled video segment and three small scaled video segments and wherein the area of each of the large scaled video segments is about nine times the area of each of the small scaled video segments.

20. The method of claim 16, further comprising:
 converting the video layout from 16:9 to 4:3; and
 transmitting the converted video layout to an endpoint comprising a 16:9 display and a codec that is not capable of processing a 16:9 video image.

* * * * *